US012427783B2

(12) United States Patent
Asada et al.

(10) Patent No.: US 12,427,783 B2
(45) Date of Patent: Sep. 30, 2025

(54) INK SUPPLIER

(71) Applicant: SCREEN Holdings Co., Ltd., Kyoto (JP)

(72) Inventors: Kazuhiko Asada, Kyoto (JP); Shinsuke Yamashita, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 160 days.

(21) Appl. No.: 18/521,408

(22) Filed: Nov. 28, 2023

(65) Prior Publication Data

US 2024/0173994 A1 May 30, 2024

(30) Foreign Application Priority Data

Nov. 28, 2022 (JP) ................................ 2022-189435

(51) Int. Cl.
*B41J 2/185* (2006.01)
*B41J 2/175* (2006.01)

(52) U.S. Cl.
CPC ........... *B41J 2/185* (2013.01); *B41J 2/17596* (2013.01)

(58) Field of Classification Search
CPC ...... B41J 2/185; B41J 2/17596; B41J 2/1721; B41J 2/1735; B41J 2/17513; B41J 2/17553; B41J 2/19; B41J 2/20; B41J 2/18
USPC ........................................................... 347/90
See application file for complete search history.

(56) References Cited

U.S. PATENT DOCUMENTS

2002/0047882 A1* 4/2002 Karlinski ................. B41J 11/42 347/85
2009/0219334 A1 9/2009 Yamamoto
2018/0147854 A1* 5/2018 Yoshida ..................... B41J 2/18
2019/0315128 A1 10/2019 Mita et al.
2020/0180322 A1 6/2020 Lee et al.
2022/0088935 A1 3/2022 Asada et al.

FOREIGN PATENT DOCUMENTS

JP 2006-281532 A 10/2006
JP 5251474 B 7/2013
JP 2015-036238 A 2/2015
JP 2019-181453 A 10/2019
JP 2022-052068 A 4/2022

OTHER PUBLICATIONS

Extended European Search Report received in European Patent Application No. 23212068.3, dated Mar. 21, 2024.

* cited by examiner

*Primary Examiner* — Jason S Uhlenhake
*Assistant Examiner* — Alexander D Shenderov
(74) *Attorney, Agent, or Firm* — Rimon P.C.

(57) ABSTRACT

An ink supplier includes a supply reservoir that stores ink to be supplied to a plurality of heads in an ink-jet printing apparatus. The supply reservoir includes: a first horizontal reservoir of a cylindrical shape having a plurality of supply ports communicating with a plurality of heads; and a first vertical reservoir having a side surface provided with a first opening directly or indirectly communicating with one end of the first horizontal reservoir. A top surface of the first horizontal reservoir is tilted from a horizontal direction at an angle of tilt equal to or greater than 0.3° in such a manner as to extend upward from the other end toward the first opening or the one end. Thus, air bubbles in the first horizontal reservoir move along the top surface into the first (Continued)

vertical reservoir through the first opening and can be removed from the first horizontal reservoir.

6 Claims, 11 Drawing Sheets

INK SUPPLIER

RELATED APPLICATIONS

This application claims the benefit of Japanese Application No. 2022-189435, filed on Nov. 28, 2022, the disclosure of which is incorporated by reference herein.

BACKGROUND OF THE INVENTION

Field of the Invention

The present invention relates to an ink supplier that supplies ink to a plurality of heads in an ink-jet printing apparatus.

Description of the Background Art

Some type of ink used in the ink-jet printing apparatus causes a precipitate easily as a result of agglomeration of a component in the ink. For example, ink of a watercolor pigment type to agglomerate easily is used as ink for flexible packaging.

In the ink-jet printing apparatus, the ink touches outside air at a nozzle provided at a head. Hence, at a nozzle not used for printing, agglomeration is caused easily as a result of evaporation of a solvent. In response to this, a circulation system of supplying ink to a head and collecting the ink from the head is employed, thereby reducing stagnation of the ink in the head to suppress agglomeration at a nozzle. A printing apparatus employing the circulation system is described in Japanese Patent Application Laid-Open No. 2022-52068, for example.

The printing apparatus described in Japanese Patent Application Laid-Open No. 2022-52068 includes a horizontal reservoir (horizontal tank 512) provided over heads arranged in a horizontal direction and from which ink is supplied to the heads, and a vertical reservoir (vertical tank 511) communicably connected to the horizontal reservoir and extending longer in a top-bottom direction than the horizontal reservoir. The horizontal reservoir is filled with the ink. A gas layer is formed at the top of the vertical reservoir. If air bubbles are generated in or mixed into the horizontal reservoir, the air bubbles are discharged from the top of the horizontal tank into the gas layer in the vertical reservoir through an air pipe (514).

Touch of the ink with gas in the air pipe, bubbles in the ink, or gas in the vertical reservoir causes a problem that the ink will agglomerate easily.

SUMMARY OF THE INVENTION

The present invention has been made in view of the foregoing circumstances, and is intended to provide a technique allowing removal of air bubbles in a reservoir while suppressing agglomeration of ink.

To solve the above-described problem, a first aspect of the present invention is intended for an ink supplier that supplies ink to a plurality of heads in an ink-jet printing apparatus, comprising: a supply reservoir storing the ink to be supplied to the plurality of heads. The supply reservoir includes: a first horizontal reservoir having a cylindrical shape extending in a direction of alignment of the plurality of heads, and having a plurality of supply ports each communicating with one of the plurality of heads; and a first vertical reservoir having a side surface provided with a first opening directly or indirectly communicating with one end of the first horizontal reservoir, and having a cylindrical shape with a closed bottom larger in a top-bottom direction than the first horizontal reservoir. A top surface from the other end of the first horizontal reservoir to the first opening is tilted from a horizontal direction at an angle of tilt equal to or greater than 0.3° in such a manner as to extend upward from the other end toward the one end.

According to a second aspect of the present invention, in the ink supplier according to the first aspect, the top surface from the other end of the first horizontal reservoir to the first opening is tilted from the horizontal direction at an angle of tilt equal to or greater than 0.3° and equal to or less than 1.5°.

According to a third aspect of the present invention, in the ink supplier according to the first aspect, the top surface from the other end of the first horizontal reservoir to the first opening is tilted from the horizontal direction at an angle of tilt equal to or greater than 0.5° and equal to or less than 1.0°.

According to a fourth aspect of the present invention, in the ink supplier according to any one of the first to third aspects, the ink is water-based ink.

According to a fifth aspect of the present invention, in the ink supplier according to the fourth aspect, the first horizontal reservoir is made of resin.

According to a sixth aspect of the present invention, the ink supplier according to any one of the first to fifth aspects comprises a collection reservoir storing the ink collected from the plurality of heads. The collection reservoir includes: a second horizontal reservoir having a cylindrical shape extending in the direction of alignment of the plurality of heads, and having a plurality of collection ports each communicating with one of the plurality of heads; and a second vertical reservoir having a side surface provided with a second opening directly or indirectly communicating with one end of the second horizontal reservoir, and having a cylindrical shape with a closed bottom larger in the top-bottom direction than the second horizontal reservoir. A top surface from the other end of the second horizontal reservoir to the second opening is tilted from the horizontal direction at an angle of tilt equal to or greater than 0.3° in such a manner as to extend upward from the other end toward the one end.

Advantageous Effects of Invention

According to the first to sixth aspects of the present invention, air bubbles in the first horizontal reservoir move along the top surface of the first horizontal reservoir into the first vertical reservoir through the first opening. Thus, it becomes possible to remove air bubbles from the inside of the first horizontal reservoir without providing a pipe for removal of air bubbles to the first horizontal reservoir that might be a cause for agglomeration.

In particular, according to the fourth aspect of the present invention, as water-based ink is more likely to agglomerate than other types of ink, the present invention is particularly useful.

In particular, according to the fifth aspect of the present invention, by using resin for forming the first horizontal reservoir, it becomes less likely to cause agglomeration of the ink than in a case where the first horizontal reservoir is made of metal.

In particular, according to the sixth aspect of the present invention, air bubbles in the second horizontal reservoir move along the top surface of the second horizontal reservoir into the second vertical reservoir through the second opening. Thus, it becomes possible to remove air bubbles from the inside of the second horizontal reservoir without providing a pipe for removal of air bubbles to the second horizontal reservoir that might be a cause for agglomeration.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
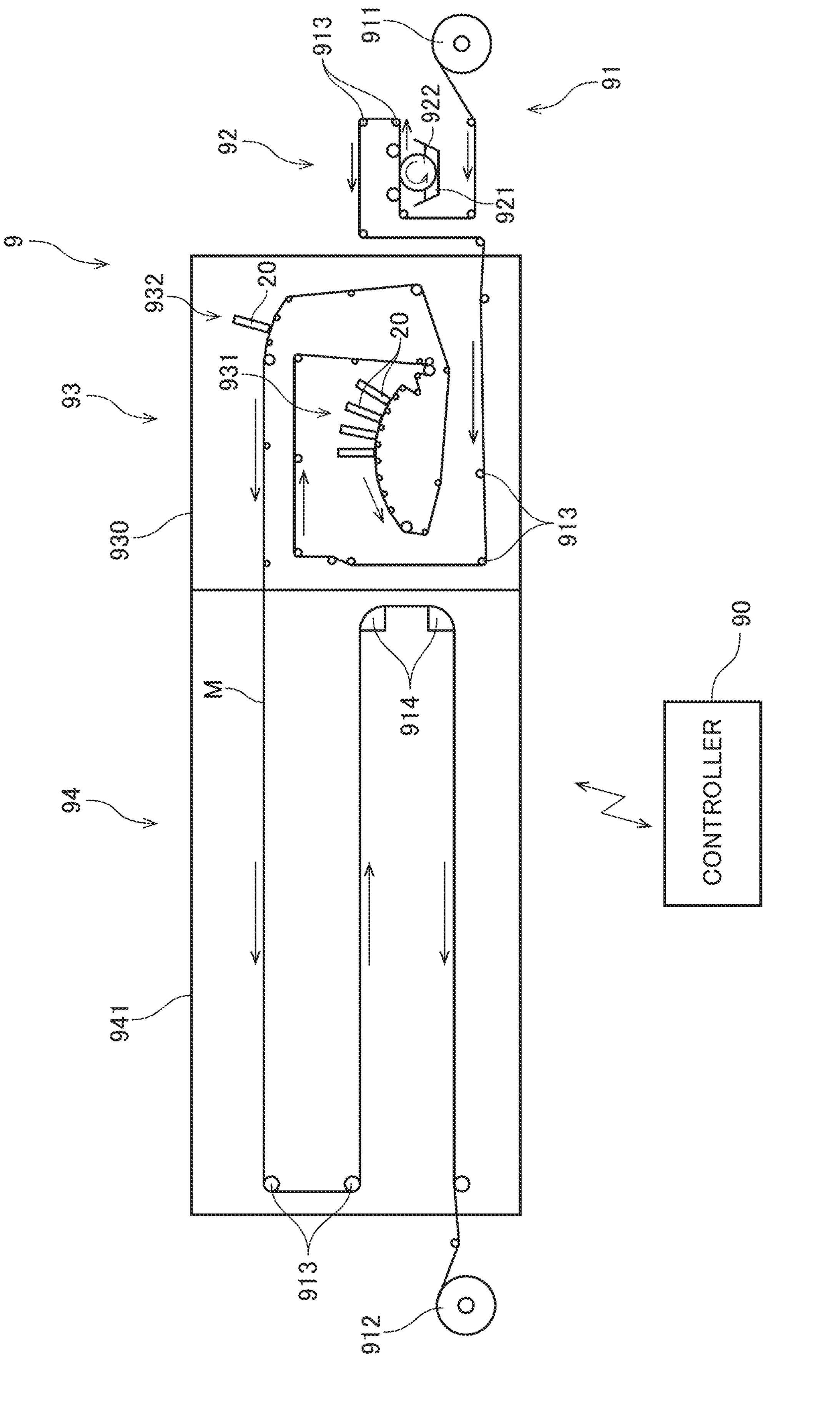
FIG. 1 is a schematic view of a printing apparatus.

A preferred embodiment of the present invention will be described below by referring to the drawings.

<1. Configuration of Printing Apparatus>

A printing apparatus 9 including an ink supplier 1 according to one preferred embodiment of the present invention will be described below by referring to FIG. 1. FIG. 1 is a schematic view of the printing apparatus 9. The printing apparatus 9 performs a coating process, a printing process, and a drying process on an elongated strip-shaped printing medium M while conveying the printing medium M by causing a controller 90 to control each part of the apparatus.

More specifically, the printing apparatus 9 is a printing apparatus that ejects ink of a watercolor pigment type in an ink-jet method to an elongated strip-shaped film sheet for flexible packaging. The printing medium M is composed of a film made of orientated polypropylene (OPP) or polyethylene terephthalate (PET), for example. However, the material of the printing medium M is not limited to a resin film but may be a different material such as paper. The printing medium M has two surfaces including a front surface on which an image is to be printed and a back surface on the opposite side to the front surface.

The printing apparatus 9 includes a conveyance mechanism 91, a coating processor 92, a printing processor 93, and a drying processor 94.

The conveyance mechanism 91 is a mechanism for conveying the printing medium M along a predetermined conveyance path. The conveyance mechanism 91 includes a feed roller 911, a take-up roller 912, and a large number of other conveyance rollers 913. The feed roller 911, the take-up roller 912, and some of the conveyance rollers 913 are rotating rollers that are caused to rotate by a motor, for example. Some of the other conveyance rollers 913 are driven rollers that are caused to rotate in response to the motion of the printing medium M.

When the printing apparatus 9 is driven, the feed roller 911, the take-up roller 912, and the rotating rollers as some of the conveyance rollers 913 rotate. Thereby, the printing medium M is unwound from the feed roller 911, subjected to the coating process by the coating processor 92, the printing process by the printing processor 93 and the drying process by the drying processor 94, and then is wound onto the take-up roller 912. In FIG. 1, arrows indicating a conveyance direction are given to the front surface of the printing medium M.

The coating processor 92 is a unit for coating the front surface of the printing medium M with a liquid primer (coating liquid). The coating processor 92 includes a pan 921 and gravure roller 922. The pan 921 stores the liquid primer. The gravure roller 922 is a roller for coating the front surface of the printing medium M conveyed by the conveyance mechanism 91 with the primer. The gravure roller 922 is arranged in such a manner as to be partially dipped in the primer stored in the pan 921.

The gravure roller 922 rotates relative to the printing medium M conveyed with the front surface placed on a lower side while holding the primer on an outer peripheral surface of the gravure roller 922, thereby coating the front surface of the printing medium M with the primer. A direction of travel of the printing medium M and a direction of the rotation of the gravure roller 922 (indicated by an arrow in FIG. 1) are opposite to each other. Specifically, the gravure roller 922 coats the front surface of the printing medium M with the primer in a so-called reverse kiss method.

The printing processor 93 includes a housing 930, a color printing unit 931, and a white printing unit 932. The color printing unit 931 and the white printing unit 932 are arranged in the housing 930. The color printing unit 931 ejects inks of a plurality of colors from above to the printing medium M conveyed with the front surface placed on an upper side. According to the present preferred embodiment, the color printing unit 931 has four head units 20 from which inks of respective colors are ejected. The inks ejected at the color printing unit 931 are inks of cyan, magenta, yellow, and black, for example. The white printing unit 932 ejects a white ink from above to the printing medium M conveyed with the front surface placed on an upper side. The white printing unit 932 has one head unit 20 from which an ink of white is ejected.

A detailed configuration of the head unit 20 and that of the ink supplier 1 for supplying ink to a plurality of heads 21 of the head unit 20 will be described later.

The printing processor 93 further includes a preliminary drying unit (not shown in the drawings) provided downstream from the color printing unit 931 and upstream from the white printing unit 932, and a preliminary drying unit (not shown in the drawings) provided downstream from the white printing unit 932. These drying units are used for drying ink ejected to the front surface of the printing medium M.

The drying processor 94 is a unit for drying the ink ejected to the front surface of the printing medium M at the printing processor 93. The drying processor 94 includes a drying furnace 941 as a housing. In the drying furnace 941, the conveyance mechanism 91 forms an S-shape conveyance path for the printing medium M. The conveyance mechanism 91 includes air turn bars 914 instead of the conveyance roller 913 provided at positions to touch the front surface of the printing medium M in the drying furnace 941.

The controller 90 is composed of a computer including a processor such as a CPU, a memory such as a RAM, and a storage part such as a hard disk drive, for example. The printing apparatus 9 controls the operations of the conveyance mechanism 91, the coating processor 92, the printing processor 93, and the drying processor 94 described above, and the operation of each part of the ink supplier 1 described later according to a computer program. By doing so, the printing process proceeds in the printing apparatus 9.

<2. Configuration of Ink Supplier>

The configuration of the ink supplier 1 for supplying ink to the plurality of heads 21 of the head unit 20 will be described next by referring to FIG. 2.

Figure 2:
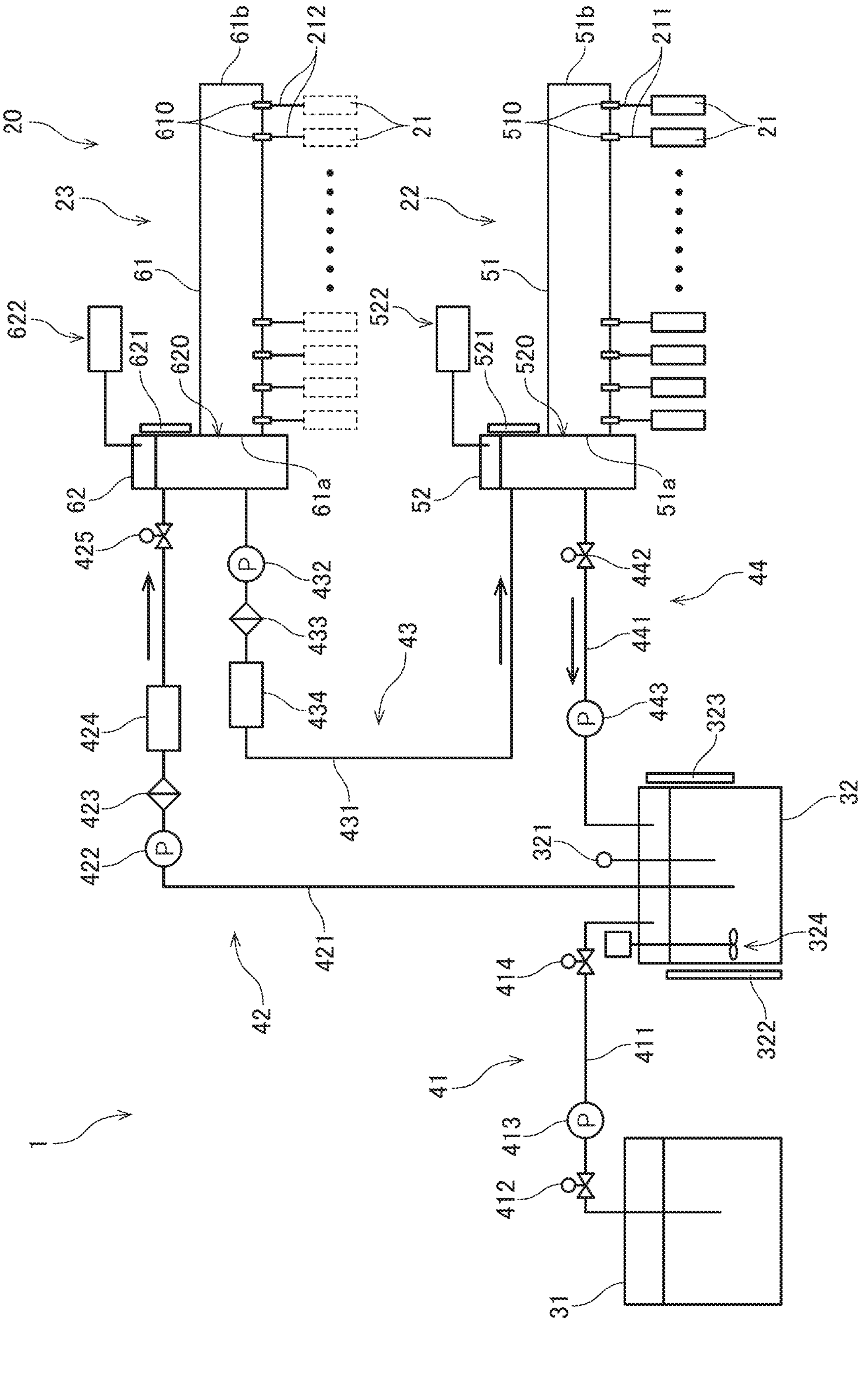
FIG. 2 is a schematic view of an ink supplier.

As shown in FIG. 2, the head unit 20 includes the plurality of heads 21 aligned in a horizontal direction (a direction perpendicular to the plane of paper of FIG. 1). In FIG. 2, heads 21 indicated by dashed lines connected to a collection reservoir 23 are the same as heads 21 indicated by solid lines connected to a supply reservoir 22. In terms of the layout of the drawing, these heads 21 are illustrated twice.

The ink supplier 1 includes the supply reservoir 22 and the collection reservoir 23 of the head unit 20, a drum tank 31, and a buffer tank 32 that function as storages of the ink. The ink supplier 1 includes a first transport unit 41, a second transport unit 42, a third transport unit 43, and a fourth transport unit 44 that function as means of transporting the ink between corresponding storages.

The head unit 20 includes the plurality of heads 21, the supply reservoir 22, and the collection reservoir 23. Each of the heads 21 has a plurality of ejection nozzles provided at a surface of the bottom of the head 21 for ejecting the ink to the printing medium M.

The supply reservoir 22 is an ink storage storing the ink to be supplied to the head 21. The supply reservoir 22 includes a first horizontal reservoir 51 and a first vertical reservoir 52.

The first horizontal reservoir 51 is a cylindrical storage extending substantially horizontally in the direction of the alignment of the plurality of heads 21. The first horizontal reservoir 51 has one end communicably connected to the first vertical reservoir 52. The first horizontal reservoir 51 is closed at the other end. The first horizontal reservoir 51 has a bottom provided with a plurality of supply ports 510 forming communication between the inside and outside of the first horizontal reservoir 51 in a top-bottom direction. Each of the supply ports 510 is communicably connected through a supply pipe 211 to the head 21 arranged below the supply port 510.

The first vertical reservoir 52 is a cylindrical storage with a covered top and a closed bottom. The first vertical reservoir 52 is larger in the top-bottom direction than the first horizontal reservoir 51. The first vertical reservoir 52 has a side surface where a first opening 520 directly communicating with the one end of the first horizontal reservoir 51 is provided.

The first vertical reservoir 52 includes a level sensor 521. A detection signal from the level sensor 521 allows the controller 90 to determine the amount of the ink stored in the supply reservoir 22. The level sensor 521 may be a floating level sensor or a level sensor of a different type.

At the supply reservoir 22, the first horizontal reservoir 51 is filled with the ink and the amount of the ink stored in the first vertical reservoir 52 is adjusted in such a manner as to form a gas layer of a certain extent at the top of the first vertical reservoir 52. The gas layer in the first vertical reservoir 52 is connected to a pressure adjuster 522. By doing so, a pressure in the first vertical reservoir 52 is kept at a predetermined negative pressure for supply reservoir.

The collection reservoir 23 is an ink storage storing the ink collected from the head 21. The collection reservoir 23 includes a second horizontal reservoir 61 and a second vertical reservoir 62.

The second horizontal reservoir 61 is a cylindrical storage extending substantially horizontally in the direction of alignment of the plurality of heads 21. The second horizontal reservoir 61 has one end communicably connected to the second vertical reservoir 62. The second horizontal reservoir 61 is closed at the other end. The second horizontal reservoir 61 has a bottom provided with a plurality of collection ports 610 forming communication between the inside and outside of the second horizontal reservoir 61 in the top-bottom direction. Each of the collection ports 610 is communicably connected through a collection pipe 212 to the head 21 arranged below the collection port 610.

The second vertical reservoir 62 is a cylindrical storage with a covered top and a closed bottom. The second vertical reservoir 62 is larger in the top-bottom direction than the second horizontal reservoir 61. The second vertical reservoir 62 has a side surface where a second opening 620 directly communicating with the one end of the second horizontal reservoir 61 is provided.

The second vertical reservoir 62 includes a level sensor 621. A detection signal from the level sensor 621 allows the controller 90 to determine the amount of the ink stored in the collection reservoir 23. The level sensor 621 may be a floating level sensor or a level sensor of a different type.

At the collection reservoir 23, the second horizontal reservoir 61 is filled with the ink and the amount of the ink stored in the second vertical reservoir 62 is adjusted in such a manner as to form a gas layer of a certain extent at the top of the second vertical reservoir 62. The gas layer in the second vertical reservoir 62 is connected to a pressure adjuster 622. By doing so, a pressure in the second vertical reservoir 62 is kept at a predetermined negative pressure for collection reservoir. The negative pressure for collection reservoir is a pressure smaller than the negative pressure for supply reservoir. Specifically, a difference between atmospheric pressure and the negative pressure for collection reservoir is larger than a difference between atmospheric pressure and the negative pressure for supply reservoir.

The drum tank 31 is an ink storage having a maximum capacity for ink storage. The ink is supplied from the drum tank 31 to the supply reservoir 22 and the collection reservoir 23 in the head unit 20 through the buffer tank 32.

The buffer tank 32 stores the ink temporarily. The buffer tank 32 has a capacity for ink storage less than that of the drum tank 31 and greater than those of the supply reservoir 22 and the collection reservoir 23. The drum tank 31 and the buffer tank 32 are arranged in areas separate from the head unit 20.

The buffer tank 32 is provided with a temperature sensor 321, a heater 322, a level sensor 323, and an agitating unit 324.

The temperature sensor 321 detects the temperature of the ink stored in the buffer tank 32. The heater 322 is attached to an outer wall of the buffer tank 32 and heats the ink in the buffer tank 32. The controller 90 controls the heater 322 on the basis of the temperature of the ink detected by the temperature sensor 321.

The level sensor 323 detects the height of the ink stored in the buffer tank 32, and outputs result of the detection to the controller 90. The agitating unit 324 agitates the ink stored in the buffer tank 32 to prevent non-uniformity of heating and non-uniformity of concentration.

The first transport unit 41 transports the ink from the drum tank 31 to the buffer tank 32. The first transport unit 41 includes a pipe 411, and a valve 412, a pump 413, and a valve 414 interposed in the pipe 411. The pipe 411 has one end placed in an ink storage region in the drum tank 31. The pipe 411 has the other end communicating with the inside of the buffer tank 32. The valves 412 and 414 are opened and the pump 413 is actuated by the controller 90, thereby feeding the ink stored in the drum tank 31 to the buffer tank 32 through the pipe 411.

The second transport unit 42 transports the ink from the buffer tank 32 to the collection reservoir 23. The second transport unit 42 includes a pipe 421, and a pump 422, a filter 423, a degassing unit 424, and a valve 425 interposed in the pipe 421. The pipe 421 has one end placed in an ink storage region in the buffer tank 32. The pipe 421 has the other end communicating with the inside of the second vertical reservoir 62 of the collection reservoir 23. The filter 423 removes a solid component (agglomeration, precipitate) from the ink. The degassing unit 424 removes air bubbles from the ink or part of a gas component dissolving in the ink. The valve 425 is opened and the pump 422 is actuated by the controller 90, thereby feeding the ink stored in the buffer tank 32 to the second vertical reservoir 62 through the pipe 421.

The third transport unit 43 transports the ink from the collection reservoir 23 to the supply reservoir 22. The third transport unit 43 includes a pipe 431, and a pump 432, a filter 433, and a degassing unit 434 interposed in the pipe 431. The pipe 431 has one end placed in an ink storage region in the second vertical reservoir 62 of the collection reservoir 23. The pipe 431 has the other end communicating with the inside of the first vertical reservoir 52 of the supply reservoir 22. The filter 433 removes a solid component (agglomeration, precipitate) from the ink. The degassing unit 434 removes air bubbles from the ink or part of a gas component dissolving in the ink. The pump 432 is actuated by the controller 90, thereby feeding the ink stored in the second vertical reservoir 62 of the collection reservoir 23 to the first vertical reservoir 52 of the supply reservoir 22 through the pipe 431.

The fourth transport unit 44 transports the ink from the supply reservoir 22 to the buffer tank 32. The fourth transport unit 44 includes a pipe 441, and a valve 442 and a pump 443 interposed in the pipe 441. The pipe 411 has one end placed in an ink storage region in the first vertical reservoir 52 of the supply reservoir 22. The pipe 441 has the other end communicating with the inside of the buffer tank 32. The pump 443 is actuated by the controller 90, thereby feeding the ink stored in the first vertical reservoir 52 of the supply reservoir 22 to the buffer tank 32 through the pipe 441.

With the configuration described above, a circulation path for the ink is formed by the supply reservoir 22, the plural sets of supply pipe 211, the head 21 and the collection pipe 212, the collection reservoir 23, and the third transport unit 43. By driving the pump 432 of the third transport unit 43, the ink is supplied from the second vertical reservoir 62 of the collection reservoir 23 into the first vertical reservoir 52 of the supply reservoir 22. This generates a flow of the ink flowing from the first vertical reservoir 52 and returning to the second vertical reservoir 62 through the first horizontal reservoir 51, the plural sets of supply pipe 211, the head 21 and the collection pipe 212, and the second horizontal reservoir 61 of the collection reservoir 23. This ink circulation path is called an "in-head-unit circulation."

As described above, the negative pressure for collection reservoir is a pressure smaller than the negative pressure for supply reservoir. Specifically, a pressure in the second horizontal reservoir 61 of the collection reservoir 23 is smaller than a pressure in the first horizontal reservoir 51 of the supply reservoir 22. Thus, a pressure in the second horizontal reservoir 61 communicating with the collection pipe 212 is smaller than a pressure in the first horizontal reservoir 51 communicating with the supply pipe 211 for each of the heads 21, thereby generating a flow of the ink in the head 21 from the supply pipe 211 toward the collection pipe 212.

A circulation path for the ink is formed by the buffer tank 32, the second transport unit 42, the collection reservoir 23, the third transport unit 43, the supply reservoir 22, and the fourth transport unit 44. Transporting the ink simultaneously through the second transport unit 42, the third transport unit 43, and the fourth transport unit 44 generates a flow of the ink flowing from the buffer tank 32 and returning to the buffer tank 32 through the second transport unit 42, the collection reservoir 23, the third transport unit 43, the supply reservoir 22, and the fourth transport unit 44. This ink circulation path is called an "out-of-head-unit circulation."

If the ink is ejected from the head 21 and the ink in the supply reservoir 22 is reduced in a printing step or a maintenance step of the head 21, an ink liquid surface in the first vertical reservoir 52 is lowered. In this case, the controller 90 recognizes reduction in the liquid surface level in the first vertical reservoir 52 using a detection signal from the level sensor 521. Then, the controller 90 starts to transport the ink through the second transport unit 42 and the third transport unit 43 in such a manner that a liquid surface level detected by each of the level sensor 521 and the level sensor 621 falls within a predetermined range. If transport of the ink is already started through the in-head-unit circulation or the out-of-head-unit circulation, the controller 90 increases the amount of the ink to be transported through each of the second transport unit 42 and the third transport unit 43.

If the ink in the buffer tank 32 is reduced by supply of the ink from the buffer tank 32 to the head unit 20, an ink liquid surface in the buffer tank 32 is lowered. In this case, the controller 90 recognizes reduction in the liquid surface level in the buffer tank 32 using a detection signal from the level sensor 323. Then, the controller 90 transports the ink through the first transport unit 41 in such a manner that a liquid surface level detected by the level sensor 323 falls within a predetermined range.

<3. Removal of Air Bubbles and Precipitates in Supply Reservoir and Collection Reservoir>

Figure 3:
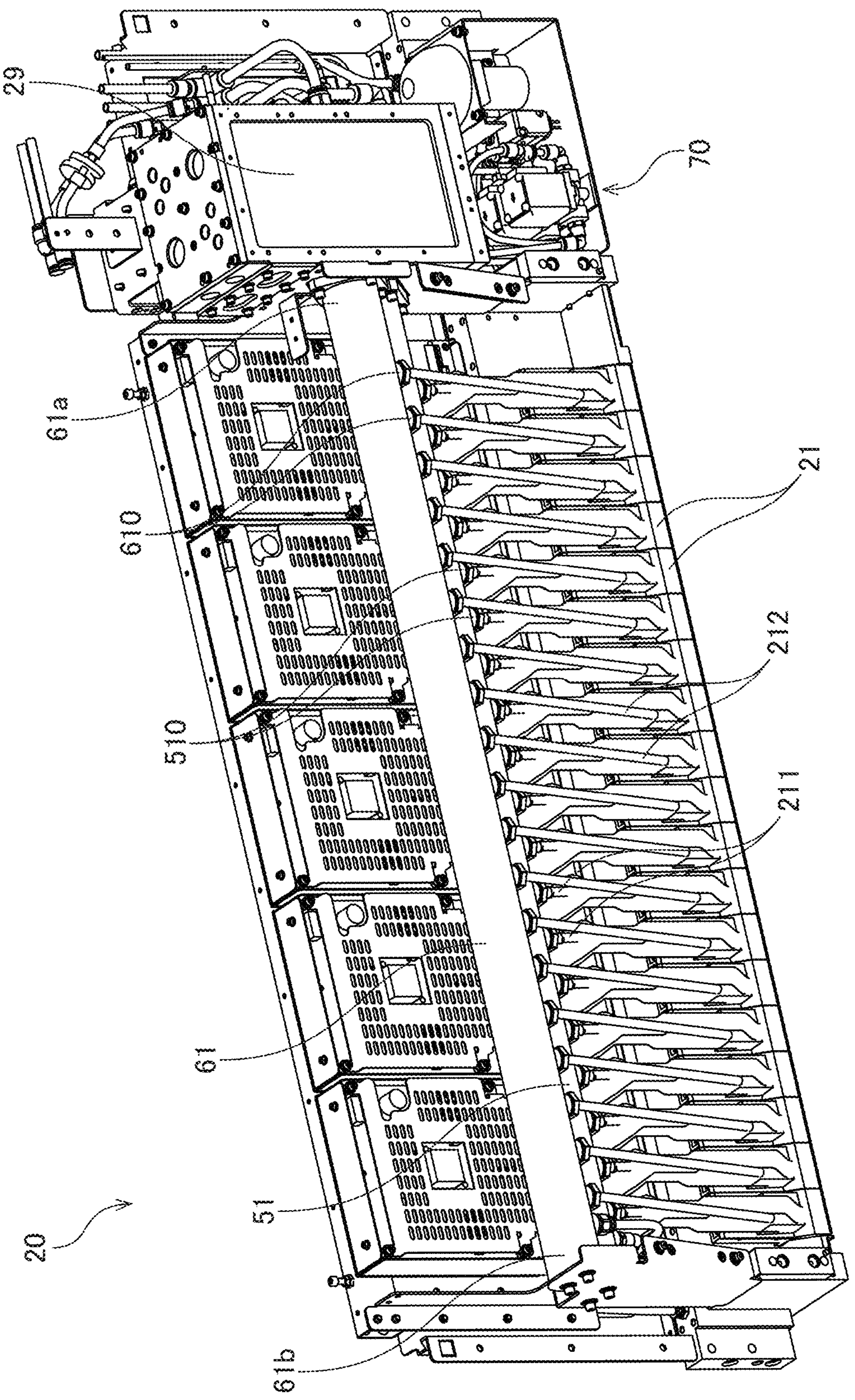
FIG. 3 is a perspective view of a head unit.
Figure 4:
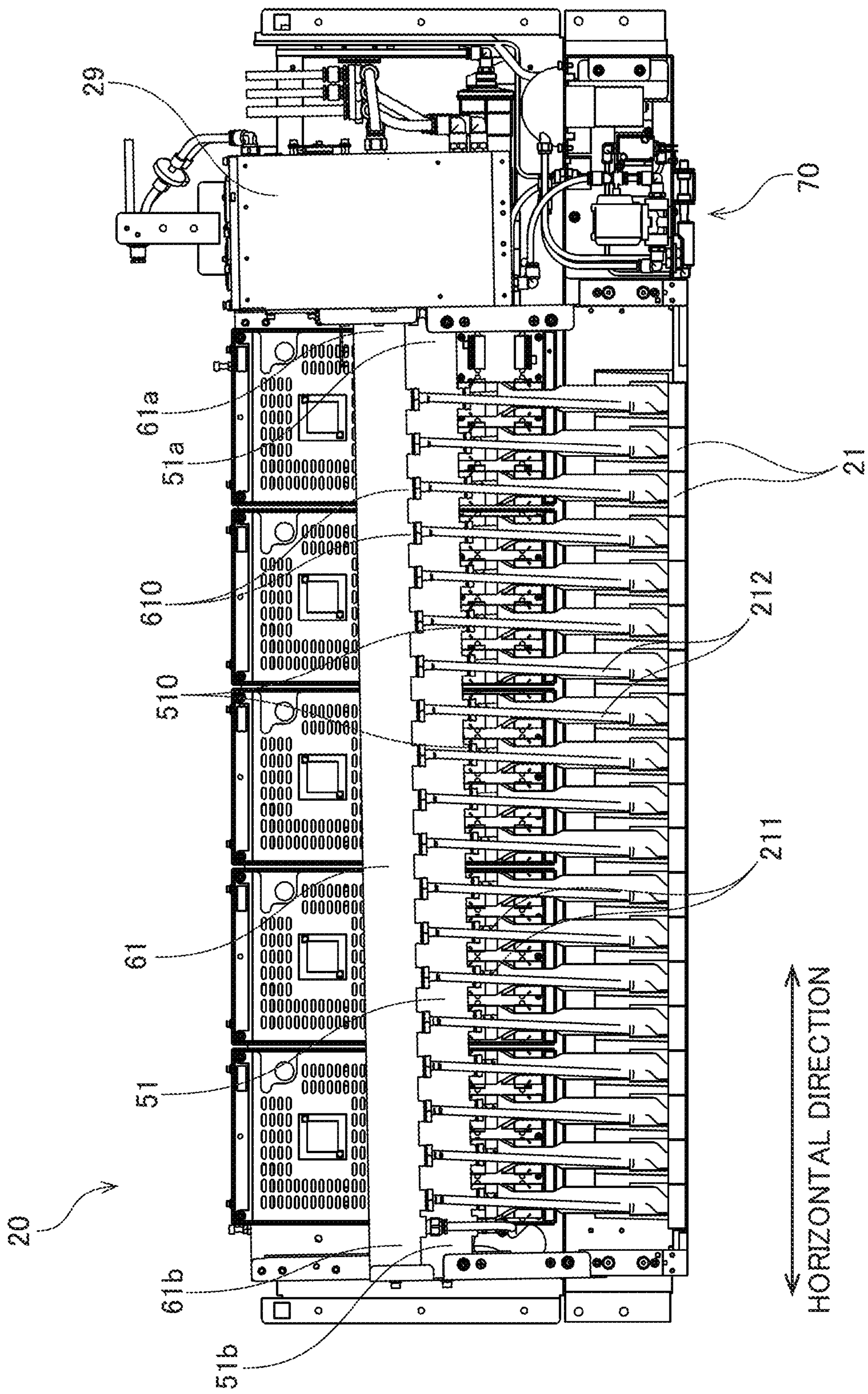
FIG. 4 is a side view of the head unit.
Figure 5:
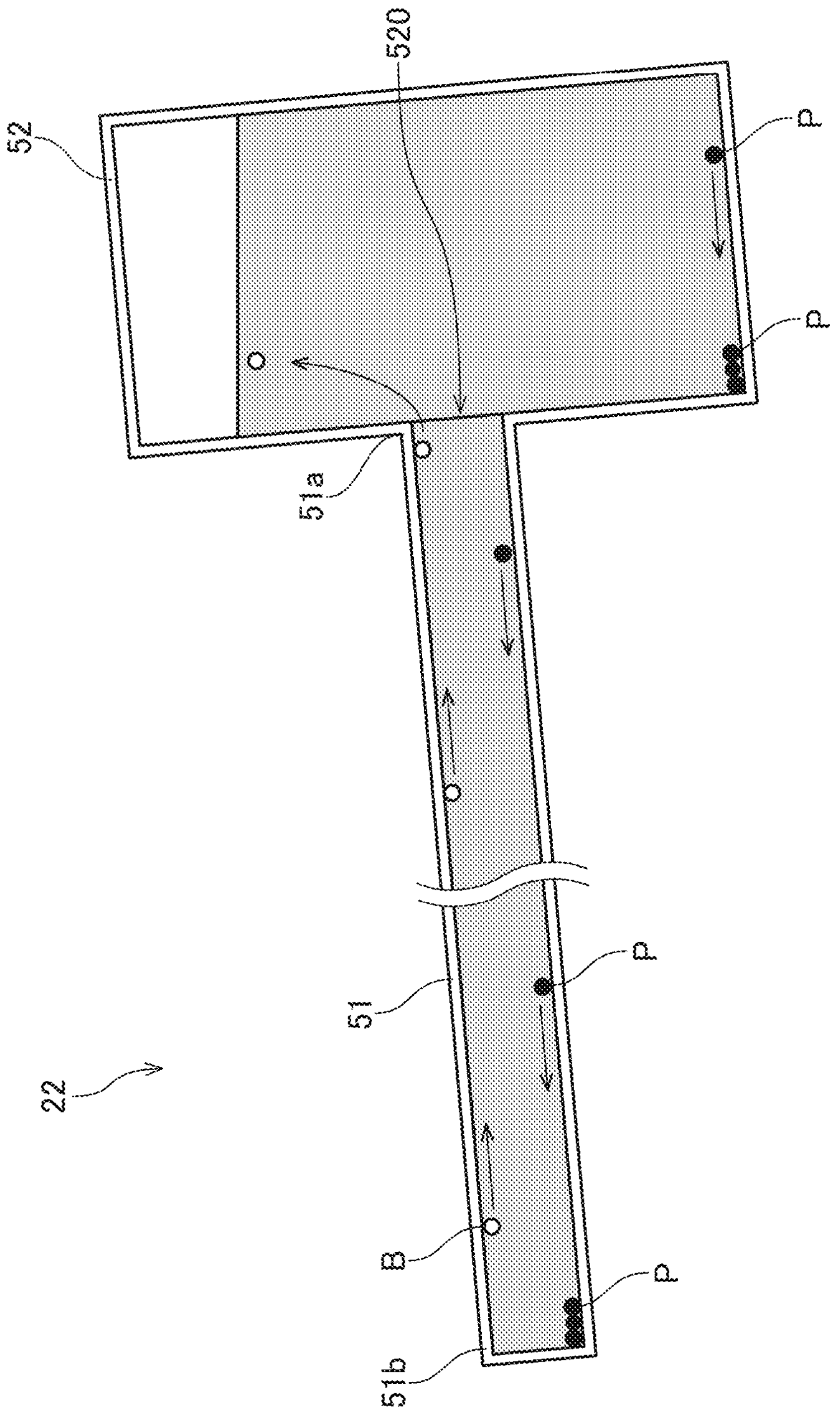
FIG. 5 is a conceptual view showing the behaviors of air bubbles and precipitates in a supply reservoir.
Figure 6:
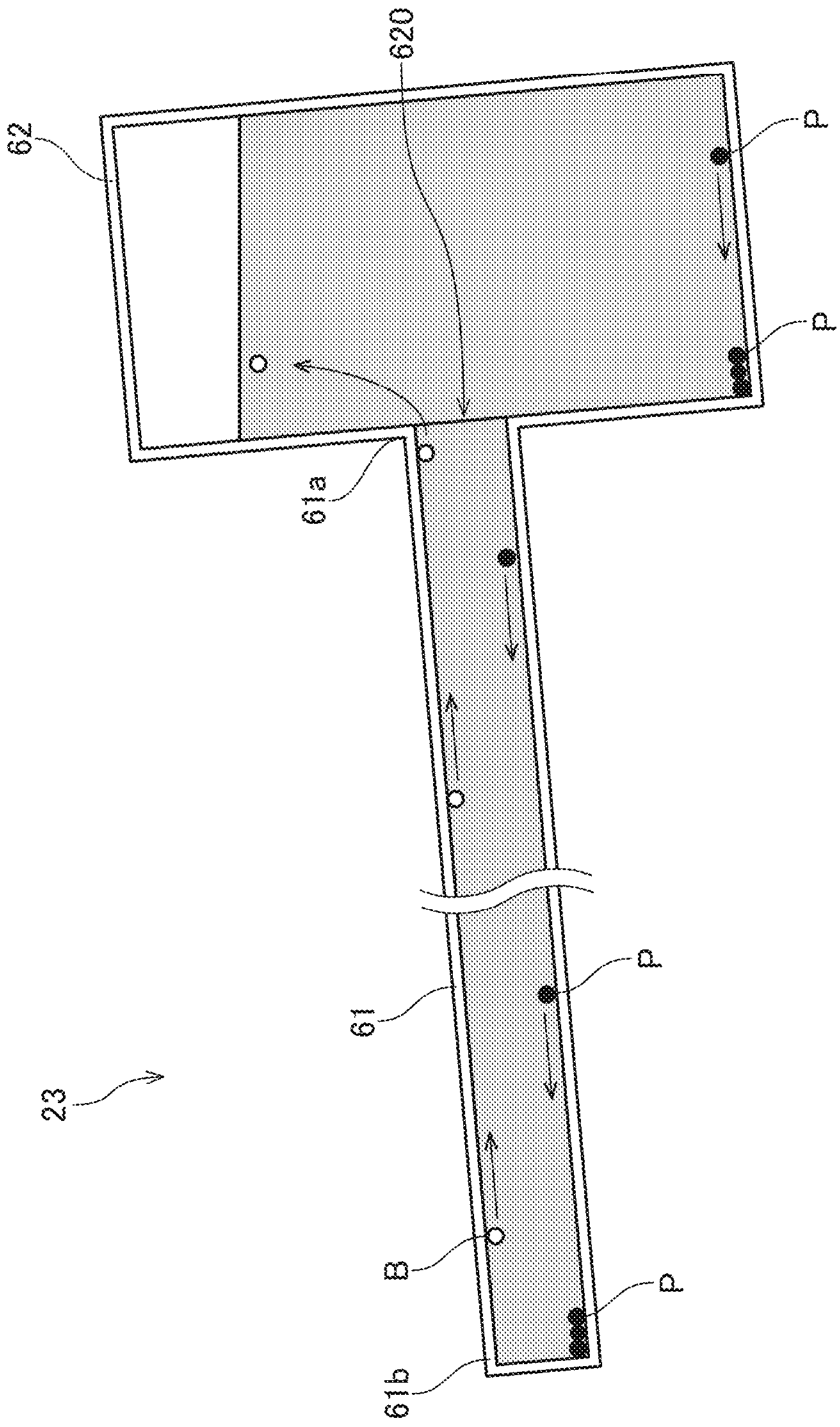
FIG. 6 is a conceptual view showing the behaviors of air bubbles and precipitates in a collection reservoir.

Removal of air bubbles and precipitates in the supply reservoir 22 and the collection reservoir 23 will be described next by referring to FIGS. 3 to 8. FIG. 3 is a perspective view of the head unit 20. FIG. 4 is a side view of the head unit 20. Some structures are omitted from the illustrations in FIGS. 3 and 4. FIG. 5 is a conceptual view showing the behaviors of air bubbles and precipitates in the supply reservoir 22. FIG. 6 is a conceptual view showing the behaviors of air bubbles and precipitates in the collection reservoir 23.

Figure 7:
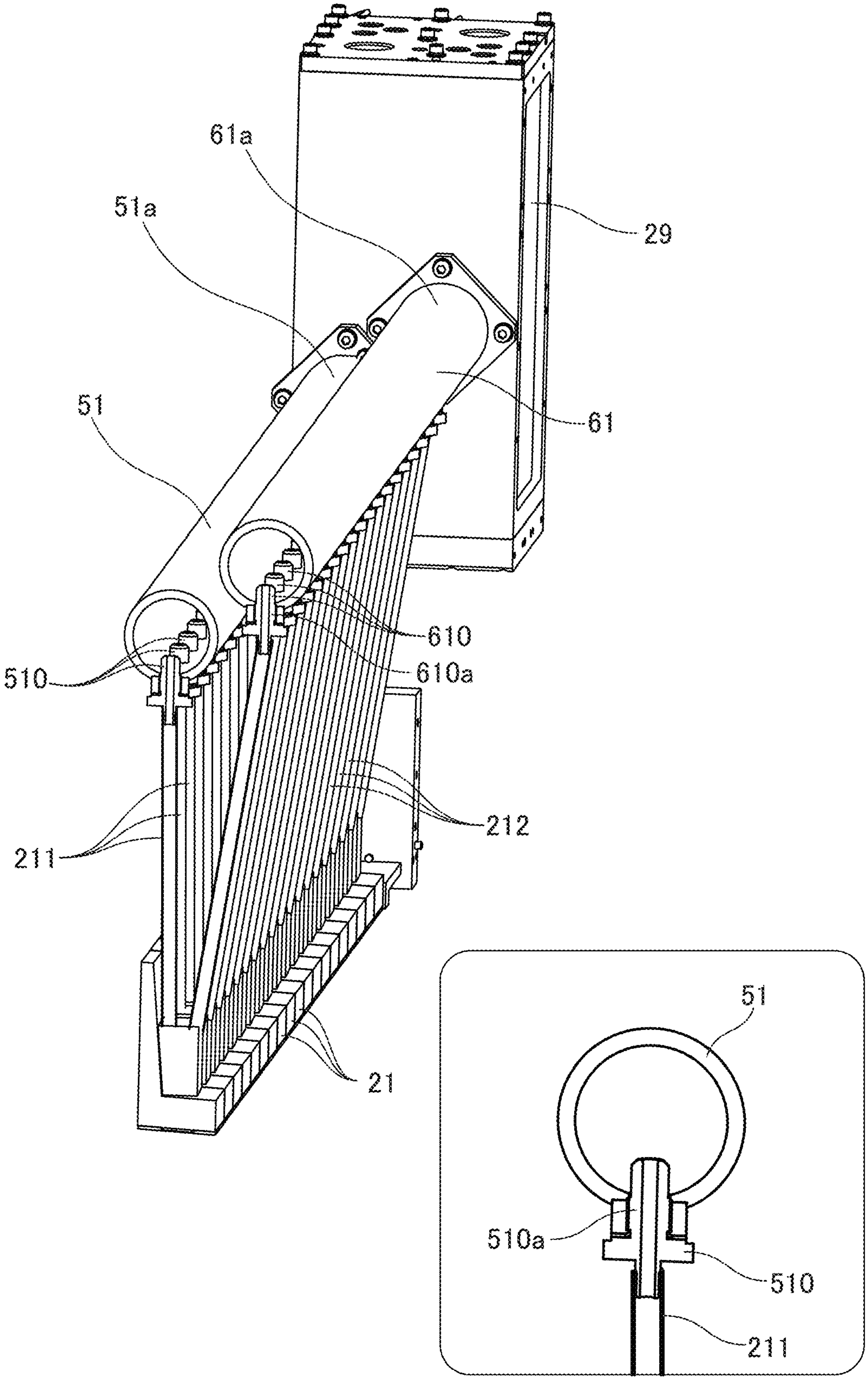
FIG. 7 is a sectional view showing a part of the head unit.
Figure 8:
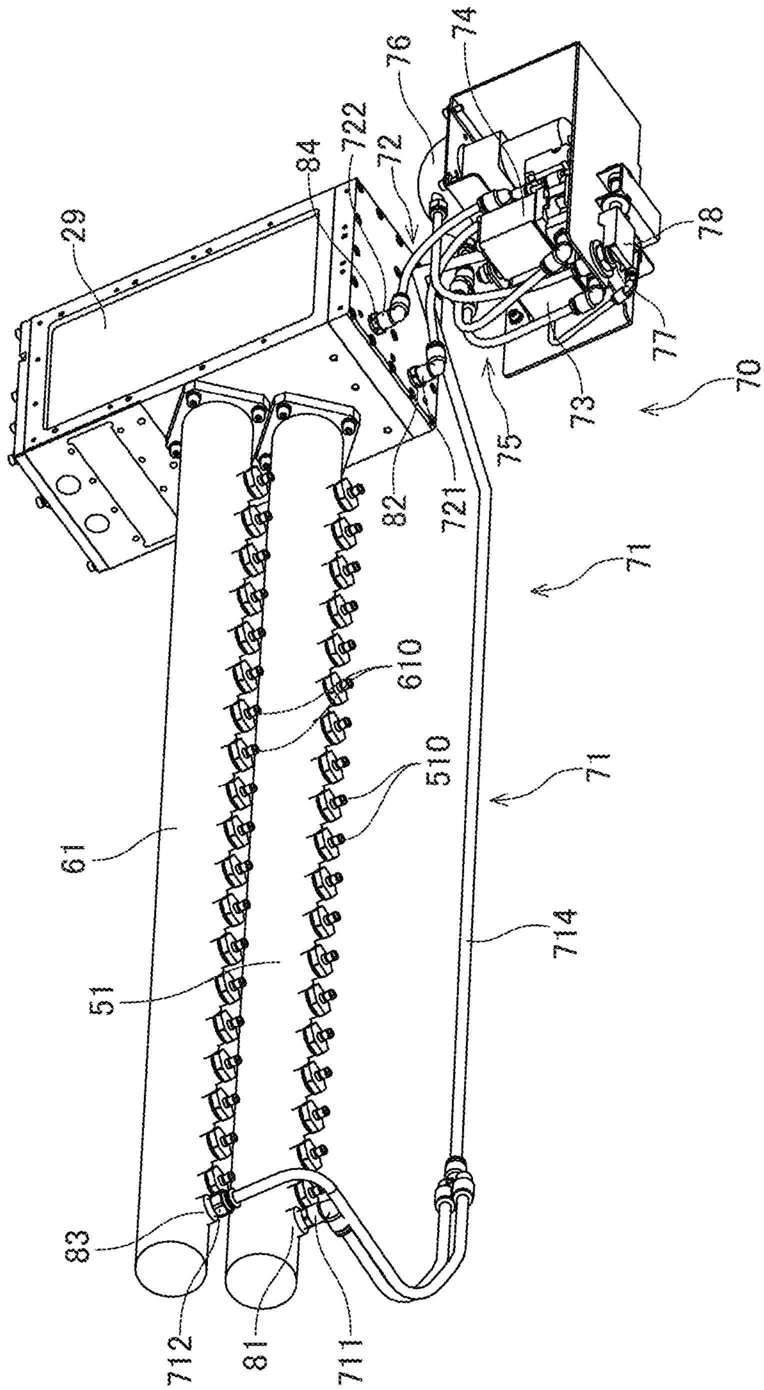
FIG. 8 is a perspective view showing a part of the head unit.

FIG. 7 is a perspective sectional view showing a part of the head unit 20. More specifically, FIG. 7 shows the heads 21, the supply pipes 211, the collection pipe 212, the supply reservoir 22, and the collection reservoir 23 of the head unit 20. FIG. 8 is a perspective view showing a part of the head unit 20. More specifically, FIG. 8 shows the supply reservoir 22, the collection reservoir 23, and a discharge unit 70.

As shown in FIGS. 3, 4, and 7, the first horizontal reservoir 51 of the present preferred embodiment has a circular cylindrical shape having a circular section. The sectional shape of the first horizontal reservoir 51 is a circle maintaining a constant shape from one end 51*a* connected to the first vertical reservoir 52 to the closed other end 51*b*. Specifically, the first horizontal reservoir 51 has a circular cylindrical shape closed at the other end. Thus, a top surface (an internal upper surface) and a bottom surface (an internal lower surface) of the first horizontal reservoir 51 are parallel to each other.

Like the first horizontal reservoir 51, the second horizontal reservoir 61 of the present preferred embodiment has a circular cylindrical shape having a circular section. The sectional shape of the second horizontal reservoir 61 is a circle maintaining a constant shape from one end 61*a* connected to the second vertical reservoir 62 to the closed other end 61*b*. Specifically, the second horizontal reservoir 61 has a circular cylindrical shape closed at the other end. Thus, a top surface (an internal upper surface) and a bottom surface (an internal lower surface) of the second horizontal reservoir 61 are parallel to each other.

The first vertical reservoir 52 and the second vertical reservoir 62 of the present preferred embodiment are housed in a housing 29 of a rectangular parallelepiped shape. As conceptually shown in FIG. 2, the first vertical reservoir 52 is a square cylindrical shape with a covered top and a closed bottom, namely, a rectangular parallelepiped shape. The first vertical reservoir 52 has a bottom surface having a planar shape and being parallel to a bottom surface of the housing 29. As conceptually shown in FIG. 2, the second vertical reservoir 62 is a square cylindrical shape with a covered top and a closed bottom, namely, a rectangular parallelepiped shape. The second vertical reservoir 62 has a bottom surface having a planar shape and being parallel to the bottom surface of the housing 29.

As shown exaggeratingly in FIGS. 4, 5, and 6, the supply reservoir 22 and the collection reservoir 23 are tilted from the direction of the alignment of the heads 21 (namely, the horizontal direction). This tilts the top surface and the bottom surface of the first horizontal reservoir 51, the bottom surface of the first vertical reservoir 52, the top surface and the bottom surface of the second horizontal reservoir 61, and the bottom surface of the second vertical reservoir 62 from the horizontal direction.

More specifically, in a range from the closed other end 51*b* to the one end 51*a* connected to the first vertical reservoir 52 through the first opening 520, the top surface and the bottom surface of the first horizontal reservoir 51 are tilted in such a manner as to extend upward from the other end 51*b* toward the one end 51*a*.

In a range from the closed other end 61*b* to the one end 61*a* connected to the second vertical reservoir 62 through the second opening 620, the top surface and the bottom surface of the second horizontal reservoir 61 are tilted in such a manner as to extend upward from the other end 61*b* toward the one end 61*a*.

The bottom surface of the first vertical reservoir 52 is parallel to the bottom surface of the first horizontal reservoir 51. Specifically, the bottom surface of the first vertical reservoir 52 is tilted from the horizontal direction. Likewise, the bottom surface of the second vertical reservoir 62 is parallel to the bottom surface of the second horizontal reservoir 61. Specifically, the bottom surface of the second vertical reservoir 62 is tilted from the horizontal direction.

As described above, the top surface of the first horizontal reservoir 51 is tilted in such a manner as to extend upward toward the one end 51*a*. Thus, as conceptually shown in FIG. 5, if air bubbles B are generated in or mixed into the first horizontal reservoir 51, the air bubbles B move toward the one end 51*a* along the top surface. Then, the air bubbles B move into the first vertical reservoir 52 through the first opening 520 and are absorbed in the gas layer at the top of the first vertical reservoir 52. By doing so, it becomes possible to remove the air bubbles B from the inside of the first horizontal reservoir 51 without providing a pipe for removal of air bubbles to the first horizontal reservoir 51 that might be a cause for agglomeration.

Likewise, the top surface of the second horizontal reservoir 61 is tilted in such a manner as to extend upward toward the one end 61*a*. Thus, as conceptually shown in FIG. 6, if air bubbles B are generated in or mixed into the second horizontal reservoir 61, the air bubbles B move toward the one end 61*a* along the top surface. Then, the air bubbles B move into the second vertical reservoir 62 through the second opening 620 and are absorbed in the gas layer at the top of the second vertical reservoir 62. By doing so, it becomes possible to remove the air bubbles B from the inside of the second horizontal reservoir 61 without providing a pipe for removal of air bubbles to the second horizontal reservoir 61 that might be a cause for agglomeration.

This configuration of reducing a cause for agglomeration is useful, particularly in the case of using the ink of a watercolor pigment type like in the present preferred embodiment more prone to agglomeration than other types of ink. Furthermore, according to the present preferred embodiment, the first horizontal reservoir 51 and the second horizontal reservoir 61 are made of resin. By doing so, in the case of using the ink of a watercolor pigment type, it becomes less likely to cause agglomeration of the ink than in a case where the first horizontal reservoir 51 and the second horizontal reservoir 61 are made of metal.

In the drawings, the supply reservoir 22 and the collection reservoir 23 are shown to be tilted to an angle of tilt about 1° in FIGS. 3 and 4 and to an angle of about 5° in FIGS. 5 and 6. Preferably, the angle of tilt of the top surface of each of the first horizontal reservoir 51 and the second horizontal reservoir 61 from the horizontal direction is equal to or greater than 0.3°. Setting the angle equal to or greater than 0.3° causes air bubbles to move easily along the top surface.

Preferably, the angle of tilt of each of the first horizontal reservoir 51 and the second horizontal reservoir 61 from the horizontal direction is equal to or less than 1.5°. If the sectional shape of the first horizontal reservoir 51 is constant like in the present preferred embodiment, tilt of the top surface also tilts the bottom surface. This causes a large difference in a distance from the supply port 510 at the bottom surface to the head 21 between a position adjacent to the one end 51*a* and a position adjacent to the other end 51*b*. Hence, if the supply pipes 211 have an equal length, larger slack is caused in the supply pipe 211 adjacent to the other end 51*b*. Setting the angle of tilt equal to or less than 1.5° makes it possible to suppress slack in the supply pipe 211 adjacent to the other end 51*b*. This also applies to the second horizontal reservoir 61.

In consideration of ease of moving air bubbles and layout of the pipes 211 and 212 as a design issue, the angle of tilt of each of the first horizontal reservoir 51 and the second horizontal reservoir 61 is more preferably equal to or greater than 0.5° and equal to or less than 1.0°.

As conceptually shown in FIG. 5, by tilting the bottom surface of the first horizontal reservoir 51 in such a manner that the bottom surface extends downward from the one end 51*a* toward the other end 51*b*, precipitates P deposited on the bottom surface in the first horizontal reservoir 51 move along the bottom surface toward the other end 51*b* as a lowermost point at the bottom surface.

In this regard, as shown in FIG. 7 and in an enlarged view in FIG. 7, the supply port 510 provided at the bottom surface of the first horizontal reservoir 51 includes a first cylindrical part 510*a* penetrating the bottom surface of the first horizontal reservoir 51 from top to bottom to form communication between the inside and outside of the first horizontal reservoir 51. The first cylindrical part 510*a* has an upper end located above the bottom surface (inner surface) of the first horizontal reservoir 51. The first cylindrical part 510*a* has a lower end located outside the first horizontal reservoir 51 and communicably connected to the supply pipe 211 coupled the head 21.

As described above, the upper end of the first cylindrical part 510*a* is located above the bottom surface of the first horizontal reservoir 51. This makes it possible to reduce a likelihood that a precipitate deposited on the bottom surface of the first horizontal reservoir 51 and to move toward the other end 51*b* along the bottom surface will enter the supply port 510, the supply pipe 211, and the head 21.

Likewise, by tilting the bottom surface of the second horizontal reservoir 61 in such a manner that the bottom surface extends downward from the one end 61*a* toward the other end 61*b*, precipitates P deposited on the bottom surface in the second horizontal reservoir 61 move along the bottom surface toward the other end 61*b* as a lowermost point at the bottom surface.

As shown in FIG. 7, the collection port 610 provided at the bottom surface of the second horizontal reservoir 61 includes a second cylindrical part 610*a* penetrating the bottom surface of the second horizontal reservoir 61 from top to bottom to form communication between the inside and outside of the second horizontal reservoir 61. The second cylindrical part 610*a* has an upper end located above the bottom surface (inner surface) of the second horizontal reservoir 61. The second cylindrical part 610*a* has a lower end located outside the second horizontal reservoir 61 and communicably connected to the collection pipe 212 coupled to the head 21.

As described above, the upper end of the second cylindrical part 610*a* is located above the bottom surface of the second horizontal reservoir 61. This makes it possible to reduce a likelihood that a precipitate deposited on the bottom surface of the second horizontal reservoir 61 and to move toward the other end 61*b* along the bottom surface will enter the collection port 610, the collection pipe 212, and the head 21.

As conceptually shown in FIG. 5, by tilting the bottom surface of the first vertical reservoir 52 in such a manner that the bottom surface extends downward toward the first opening 520, precipitates P deposited on the bottom surface in the first vertical reservoir 52 move along the bottom surface toward an end adjacent to the first opening 520 as a lowermost point at the bottom surface.

Likewise, as conceptually shown in FIG. 6, by tilting the bottom surface of the second vertical reservoir 62 in such a manner that the bottom surface extends downward toward the second opening 620, precipitates P deposited on the bottom surface in the second vertical reservoir 62 move along the bottom surface toward an end adjacent to the second opening 620 as a lowermost point at the bottom surface.

As described above, the bottom surface of each of the first horizontal reservoir 51, the first vertical reservoir 52, the second horizontal reservoir 61, and the second vertical reservoir 62 has a shape tilted toward the lowermost point at the corresponding bottom surface. As a result, the precipitates P gather at the lowermost point at each bottom surface.

As shown in FIG. 8, the first horizontal reservoir 51 includes a first discharge port 81 penetrating the bottom surface from top to bottom in the vicinity of the other end 51*b* as the lowermost point at the bottom surface. The first vertical reservoir 52 includes a second discharge port 82 penetrating the bottom surface from top to bottom in the vicinity of the end thereof adjacent to the first opening 520 as the lowermost point at the bottom surface. The second horizontal reservoir 61 includes a third discharge port 83 penetrating the bottom surface from top to bottom in the vicinity of the other end 61*b* as the lowermost point at the bottom surface. The second vertical reservoir 62 includes a fourth discharge port 84 penetrating the bottom surface from top to bottom in the vicinity of the end thereof adjacent to the second opening 620 as the lowermost point at the bottom surface. In this way, the discharge port for discharge of a precipitate is provided in the vicinity of the lowermost point at each of the bottom surfaces where the precipitate gathers.

The ink supplier 1 includes the discharge unit 70 for discharging a precipitate accumulated in the first horizontal reservoir 51, the first vertical reservoir 52, the second horizontal reservoir 61, and the second vertical reservoir 62.

As shown in FIG. 8, the discharge unit 70 includes a first discharge pipe 71, a second discharge pipe 72, a first solenoid valve 73, a second solenoid valve 74, a third discharge pipe 75, a discharge pump 76, a drain exit 77, and a drip receiver 78.

The first discharge pipe 71 includes a first inlet 711, a second inlet 712, an outlet 713 (not shown in the drawings), and a pipe section 714. The first inlet 711 is connected to the first discharge port 81 of the first horizontal reservoir 51. The second inlet 712 is connected to the third discharge port 83 of the second horizontal reservoir 61. The outlet 713 is connected to an input side of the first solenoid valve 73. The pipe section 714 branches into a Y-shape. Thus, an incoming liquid from the first inlet 711 and an incoming liquid from the second inlet 712 are merged to flow out through the outlet 713.

Figure 9:
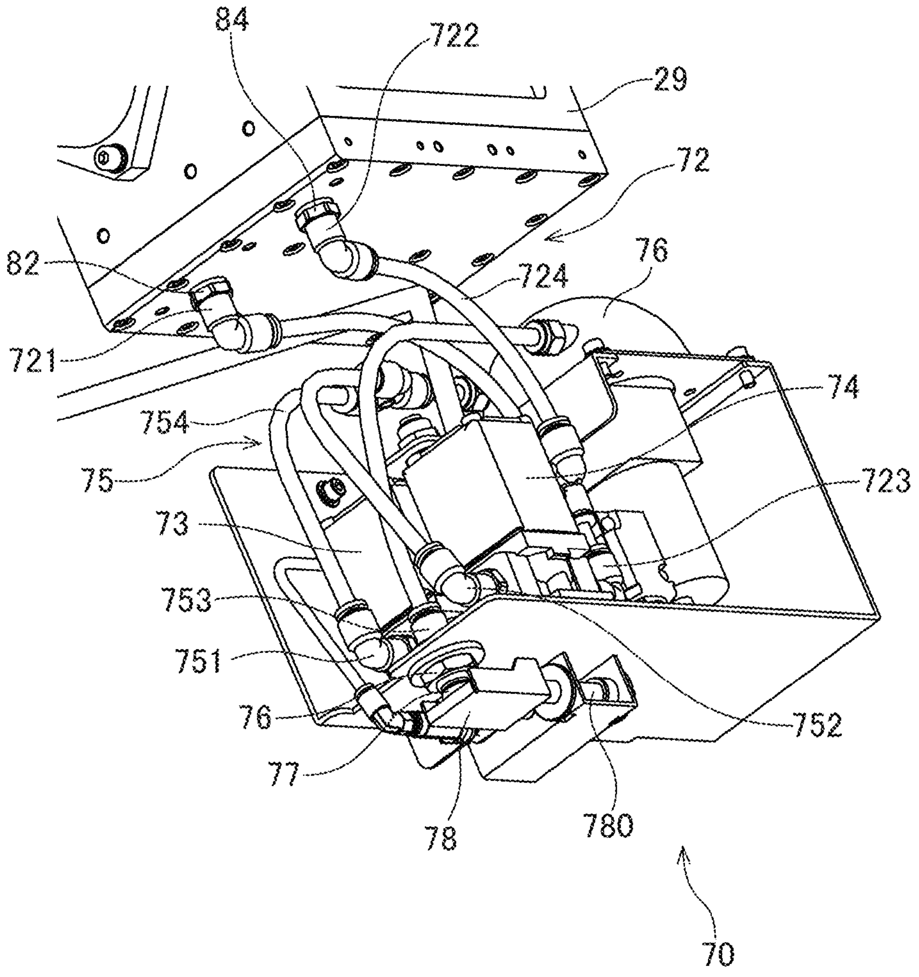
FIG. 9 is a perspective view showing a part of a discharge unit.
Figure 10:
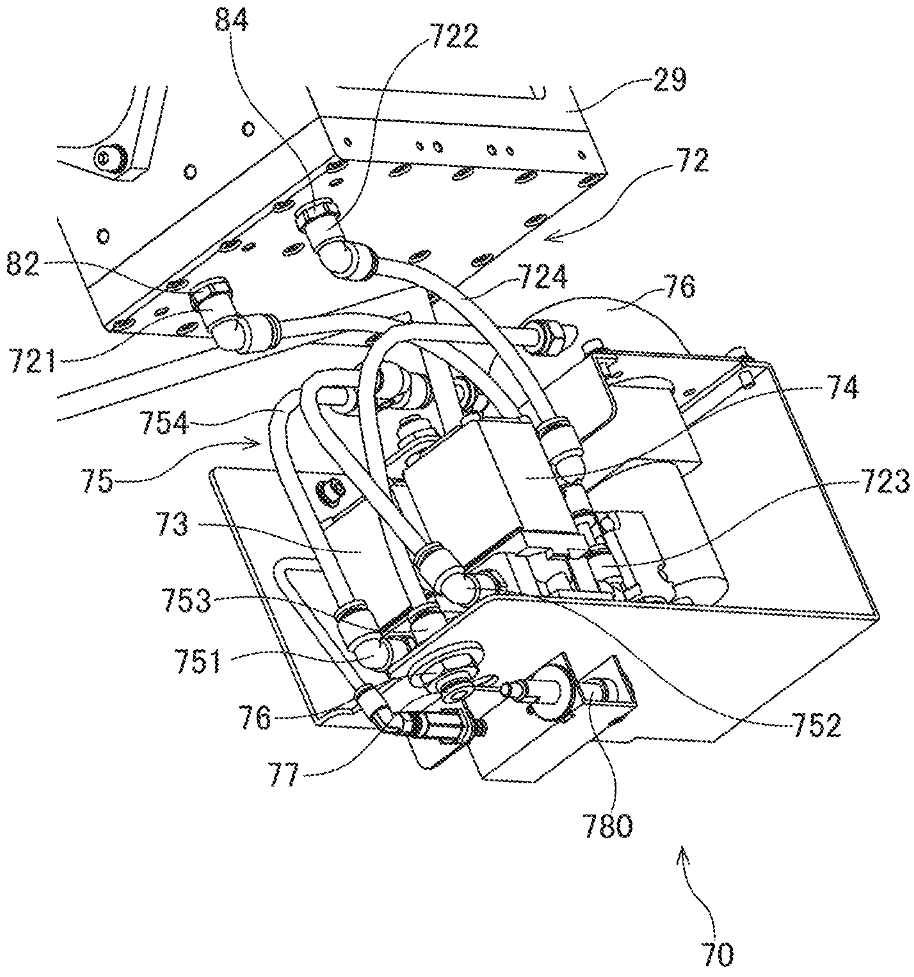
FIG. 10 is a perspective view showing a part of the discharge unit.

As shown in FIGS. 9 and 10, the second discharge pipe 72 includes a first inlet 721, a second inlet 722, an outlet 723, and a pipe section 724. The first inlet 721 is connected to the second discharge port 82 of the first vertical reservoir 52. The second inlet 722 is connected to the fourth discharge port 84 of the second vertical reservoir 62. The outlet 723 is connected to an input side of the second solenoid valve 74. The pipe section 724 branches into a Y-shape. Thus, an incoming liquid from the first inlet 721 and an incoming liquid from the second inlet 722 are merged to flow out through the outlet 723.

The third discharge pipe 75 includes a first inlet 751, a second inlet 752, an outlet 753, and a pipe section 754. The first inlet 751 is connected to an output side of the first solenoid valve 73. The second inlet 752 is connected to an output side of the second solenoid valve 74. The pipe section 754 branches into a Y-shape. Thus, an incoming liquid from the first inlet 751 and an incoming liquid from the second inlet 752 are merged to flow out through the outlet 753. If only one of the first solenoid valve 73 and the second solenoid valve 74 is opened, a liquid flows from only one of the first inlet 751 and the second inlet 752 to flow out through the outlet 753.

The discharge pump 76 is a so-called tube pump that squeezes a flexible pipe with a roller to generate a flow of a fluid in the pipe. Even if ink flowing in the pipe contains a precipitate, using such a tube pump as the discharge pump 76 makes it possible to deliver the ink together with the precipitate without causing operation failure.

The discharge pump 76 is attached to a part of the pipe section 754 of the third discharge pipe 75 closer to the outlet 753 than the Y-shape branch. By doing so, driving the discharge pump 76 generates a flow of the ink from the first inlet 751 toward the outlet 753 and a flow of the ink from the second inlet 752 toward the outlet 753 in the third discharge pipe 75.

The outlet 753 of the third discharge pipe 75 is connected to the drain exit 77. The drain exit 77 is configured in such a manner as to discharge the ink downward. The drip receiver 78 of a dish shape is provided under the drain exit 77. The drip receiver 78 is moved by a drip receiver moving mechanism 780 between a drip receiving position directly under the drain exit 77 (a position in FIG. 9) and a retreat position not overlapping the drain exit 77 one above the other (not shown in the drawings). An air cylinder is used as the drip receiver moving mechanism 780, for example.

According to the present preferred embodiment, during implementation of a process of discharging the ink by the discharge unit 70, discharge of the ink from the horizontal reservoirs 51 and 61 and discharge of the ink from the vertical reservoirs 52 and 62 are conducted separately. A procedure thereof is as follows.

First, the discharge pump 76 is driven while the first solenoid valve 73 is opened. Opening the first solenoid valve 73 forms communication between the outlet 713 of the first discharge pipe 71 and the first inlet 751 of the third discharge pipe 75 through the first solenoid valve 73. Driving the discharge pump 76 generates a flow of the ink from the first inlet 751 toward the outlet 753 in the third discharge pipe 75. By doing so, a flow of a fluid from the first inlet 711 and a flow of a fluid from the second inlet 712 toward the outlet 713 are generated in the first discharge pipe 71. As a result, the ink containing a precipitate is sucked through the first discharge port 81 of the first horizontal reservoir 51 connected to the first inlet 711 of the first discharge pipe 71 and through the third discharge port 83 of the second horizontal reservoir 61 connected to the second inlet 712 of the first discharge pipe 71, and is then discharged through the drain exit 77. After passage of a predetermined period of time, the first solenoid valve 73 is closed. At this time, the discharge pump 76 may be stopped or may be kept driven.

Next, the discharge pump 76 is driven while the second solenoid valve 74 is opened. Opening the second solenoid valve 74 forms communication between the outlet 723 of the second discharge pipe 72 and the second inlet 752 of the third discharge pipe 75 through the second solenoid valve 74. Driving the discharge pump 76 generates a flow of the ink from the second inlet 752 toward the outlet 753 in the third discharge pipe 75. By doing so, a flow of a fluid from the first inlet 721 and a flow of a fluid from the second inlet 722 toward the outlet 723 are generated in the second discharge pipe 72. As a result, the ink containing a precipitate is sucked through the second discharge port 82 of the first vertical reservoir 52 connected to the first inlet 721 of the second discharge pipe 72 and through the fourth discharge port 84 of the second vertical reservoir 62 connected to the second inlet 722 of the second discharge pipe 72, and is then discharged through the drain exit 77. After passage of a predetermined period of time, the second solenoid valve 74 is closed and the discharge pump 76 is stopped. The process is discharging the ink is performed in this way.

The process of discharging the ink by the discharge unit 70 is performed when the printing process by the printing apparatus 9 stops. When the printing process stops, a cap to receive the discharged ink is arranged under the head unit 20, for example. Then, as maintenance of the head unit 20, the ink is ejected from the head 21 in a purge process, for example, or the process of discharging the ink is performed by the discharge unit 70. Thus, during implementation of the process of discharging the ink by the discharge unit 70, the drip receiver 78 is located at the retreat position to cause the ink discharged through the drain exit 77 to move toward the cap. For implementation of the printing process thereafter, the head unit 20 and the cap are moved away from each other and the head unit is located above the printing medium M. At this time, the drip receiver 78 is located at the drip receiving position. By doing so, the ink adhering to the periphery of the drain exit 77 becomes unlikely to drop onto the printing medium M under the drain exit 77.

<4. Modifications>

While the preferred embodiment of the present invention has been described above, the present invention is not limited to the above-described embodiment.

According to the above-described preferred embodiment, the one ends 51*a* and 61*a* of the horizontal reservoirs 51 and 61 directly communicate with the vertical reservoirs 52 and 62 through the openings 520 and 620 respectively. However, the present invention is not limited to this configuration. The one ends 51*a* and 61*a* of the horizontal reservoirs 51 and 61 may form indirect communications through connection pipes, for example.

Figure 11:
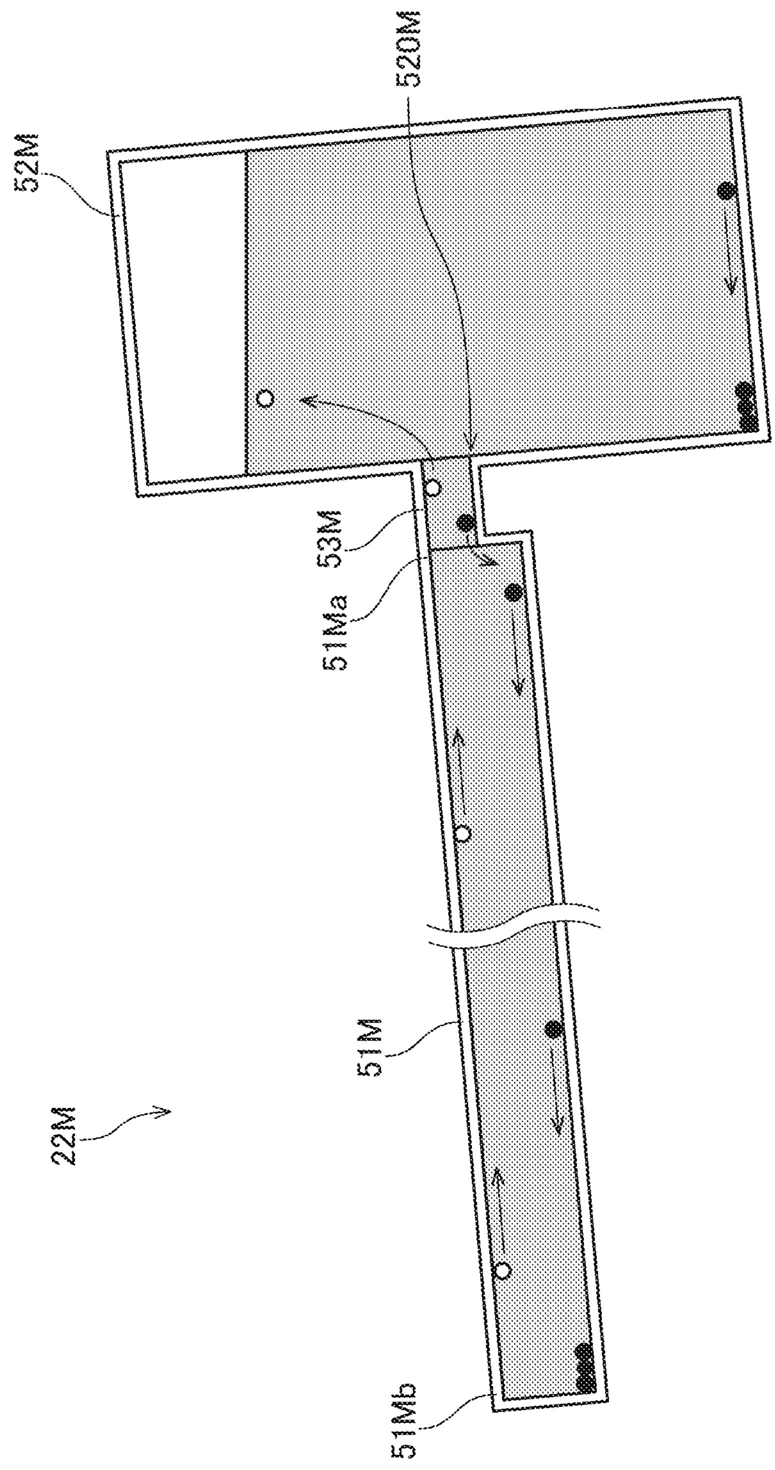
FIG. 11 is a conceptual view showing the behaviors of air bubbles and precipitates in a supply reservoir according to a modification.

FIG. 11 is a conceptual view showing the behaviors of air bubbles and precipitates in a supply reservoir 22M according to a modification. At the supply reservoir 22M, one end 51Ma of a first horizontal reservoir 51M and a first opening 520M of a first vertical reservoir 52M are communicably connected to each other through a connection pipe 53M.

In the illustration in FIG. 11, a top surface of the first horizontal reservoir 51M and a top surface of the connection pipe 53M are continuous with each other while extending at the same angle of tilt from the other end 51Mb of the first horizontal reservoir 51M to the first opening 520M. By doing so, the top surface from the other end 51Mb of the first horizontal reservoir 51M to the first opening 520M is tilted from the horizontal direction at a predetermined angle of tilt in such a manner as to extend upward from the other end 51Mb toward the one end 51Ma of the first horizontal reservoir 51M. By doing so, even if the first horizontal reservoir 51M and the first vertical reservoir 52M are communicably connected to each other indirectly through the connection pipe 53M, air bubbles in the first horizontal reservoir 51M are still allowed to move along the top surface of the first horizontal reservoir 51M and the top surface of the connection pipe 53M into the first vertical reservoir 52M through the first opening 520.

According to the above-described preferred embodiment, the respective bottom surfaces of the vertical reservoirs 52 and 62 have planar shapes tilted from the horizontal direction. Thus, the lowermost points at the bottom surfaces are located at ends of the bottom surfaces of the vertical reservoirs 52 and 62, and the discharge ports 82 and 84 are provided in the vicinity of the end of the vertical reservoir 52 and in the vicinity of the end of the vertical reservoir 62 respectively. However, the bottom surfaces of the vertical reservoirs 52 and 62 are not limited to planar shapes. For example, each of the bottom surfaces may have a funnel shape pointed downward further at a position closer to the center to locate a lowermost point at the center of the bottom surface, and a discharge port may be provided at the center of the bottom surface.

The ink used in the above-described preferred embodiment is ink of a watercolor pigment type. However, the present invention is not limited to this configuration. The ink may be oil-based ink or dye-based ink.

According to the above-described preferred embodiment, the printing apparatus 9 includes the coating processor 92 and the drying processor 94. However, the present invention is not limited to this configuration. The ink supplier of the present invention may be used in a printing apparatus to perform only the printing process.

The components appearing in the above-described embodiment and the modifications may be combined together, as appropriate, without inconsistencies.

REFERENCE SIGNS LIST

1 Ink supplier
9 Printing apparatus
20 Head unit
21 Head
22, 22M Supply reservoir
23 Collection reservoir
51, 51M First horizontal reservoir
51*a*, 51Ma One end of first horizontal reservoir
51*b*, 51Mb Other end of first horizontal reservoir
52, 52M First vertical reservoir
53M Connection pipe
61 Second horizontal reservoir
61*a* One end of second horizontal reservoir
61*b* Other end of second horizontal reservoir
62 Second vertical reservoir
70 Discharge unit
71 First discharge pipe
72 Second discharge pipe
75 Third discharge pipe
76 Discharge pump
211 Supply pipe
212 Collection pipe
510 Supply port
510*a* First cylindrical part
520, 520M First opening
610 Collection port
610*a* Second cylindrical part
620 Second opening

What is claimed is:

1. An ink supplier that supplies ink to a plurality of heads in an ink-jet printing apparatus, comprising:

a supply reservoir storing said ink to be supplied to said plurality of heads, said supply reservoir including:

a first horizontal reservoir having a cylindrical shape extending in a direction of alignment of said plurality of heads, and having a plurality of supply ports each communicating with one of said plurality of heads; and a first vertical reservoir having a side surface provided with a first opening directly or indirectly communicating with one end of said first horizontal reservoir, and having a cylindrical shape with a closed bottom larger in a top-bottom direction than said first horizontal reservoir, a top surface from the other end of said first horizontal reservoir to said first opening being tilted from a horizontal direction at an angle of tilt equal to or greater than 0.3° in such a manner as to extend upward from said other end toward said one end.

2. The ink supplier according to claim 1, wherein said top surface from said other end of said first horizontal reservoir to said first opening is tilted from the horizontal direction at an angle of tilt equal to or greater than 0.3° and equal to or less than 1.5°.

3. The ink supplier according to claim 1, wherein said top surface from said other end of said first horizontal reservoir to said first opening is tilted from the horizontal direction at an angle of tilt equal to or greater than 0.5° and equal to or less than 1.0°.

4. The ink supplier according to claim 1, wherein said ink is water-based ink.

5. The ink supplier according to claim 4, wherein said first horizontal reservoir is made of resin.

6. The ink supplier according to claim 1, further comprising:

a collection reservoir storing said ink collected from said plurality of heads, wherein said collection reservoir includes:

a second horizontal reservoir having a cylindrical shape extending in the direction of alignment of said plurality of heads, and having a plurality of collection ports each communicating with one of said plurality of heads; and a second vertical reservoir having a side surface provided with a second opening directly or indirectly communicating with one end of said second horizontal reservoir, and having a cylindrical shape with a closed bottom larger in the top-bottom direction than said second horizontal reservoir, and a top surface from the other end of said second horizontal reservoir to said second opening is tilted from the horizontal direction at an angle of tilt equal to or greater than 0.3° in such a manner as to extend upward from said other end toward said one end.

* * * * *